US008406381B2

(12) United States Patent
Jarosinski et al.

(10) Patent No.: US 8,406,381 B2
(45) Date of Patent: Mar. 26, 2013

(54) SYSTEM AND METHOD FOR PROVIDING CALL HANDLING IN LAW ENFORCEMENT ACTIONS

(75) Inventors: Kathleen Frances Jarosinski, Baltimore, MD (US); Rosa M. Underwood, Washington, DC (US); Euclid Sylvester Brooks, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 167 days.

(21) Appl. No.: 13/090,429

(22) Filed: Apr. 20, 2011

(65) Prior Publication Data
US 2012/0269329 A1    Oct. 25, 2012

(51) Int. Cl.
*H04M 11/04* (2006.01)
(52) U.S. Cl. .................. 379/37; 379/212.01; 455/404.1; 455/450; 370/343
(58) Field of Classification Search ............... 379/37, 379/212.01; 455/404.1, 450; 370/343
See application file for complete search history.

(56) References Cited

U.S. PATENT DOCUMENTS

| | | | | |
|---|---|---|---|---|
| 2009/0143046 A1* | 6/2009 | Smith | ......................... | 455/404.1 |
| 2009/0247204 A1* | 10/2009 | Sennett et al. | ................ | 455/512 |
| 2009/0285377 A1* | 11/2009 | Sennett et al. | ........... | 379/201.04 |
| 2011/0141947 A1* | 6/2011 | Li et al. | ......................... | 370/259 |
| 2012/0282879 A1* | 11/2012 | Smith | ......................... | 455/404.1 |

* cited by examiner

*Primary Examiner* — Creighton Smith (57) ABSTRACT

A method for providing law enforcement call preemption of VoIP subscribers may include receiving a call preemption request from a law enforcement agency (LEA) designating at least one subscriber telephone number and at least one LEA telephone number, wherein the at least one subscriber telephone number is associated with a voice over Internet protocol (VoIP) calling plan subscriber. An incoming call policy may be generated at a voice application server and configured to allow incoming calls to the at least one subscriber telephone number from only the at least one LEA telephone number. The incoming call policy may be stored in a memory associated with the voice application server. The incoming call policy may be activated. An outgoing call transfer policy may be generated at the voice application server and configured to automatically transfer all outgoing calls from the at least one subscriber telephone number to a designated one of the at least one LEA telephone numbers. The outgoing call transfer policy may be stored in the memory associated with the voice application server. The outgoing call transfer policy may be activated.

20 Claims, 5 Drawing Sheets

| SUBSCRIBER | ACTIVE | DESCRIPTION | SCHEDULE | INCOMING TN |
|---|---|---|---|---|
| 3013009758 | Y | HOSTAGE SITUATION | ALL DAY; EVERY DAY | 3011254568 |
| 7032568759 | N | CRIME SCENE | ALL DAY; EVERY DAY | 7035897586 |
| ... | ... | ... | ... | ... |
| 2024567895 | Y | HOSTAGE SITUATION | ALL DAY; EVERY DAY | 7035689856 |

FIG. 4B

| SUBSCRIBER | ACTIVE | DESCRIPTION | TRANSFER TN |
|---|---|---|---|
| 3013009758 | Y | HOSTAGE SITUATION | 3011254568 |
| 7032568759 | N | EMT | 7035897586 |
| ... | ... | ... | ... |
| 2024567895 | Y | HOSTAGE SITUATION | 7035689856 |

FIG. 5

SYSTEM AND METHOD FOR PROVIDING CALL HANDLING IN LAW ENFORCEMENT ACTIONS

BACKGROUND

Conventional telephone systems, such as the public switched telephone network (PSTN) are suitable for call interception for both incoming and outgoing calls in the event of an emergency or law enforcement event, such as a hostage scenario. In such systems, a local switch (e.g., a class 5 switch) servicing the location may be configured to provide direct access to and from only designated telephone lines, such as a telephone line associated with the hostage negotiator or other law enforcement personnel.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Figure 1:
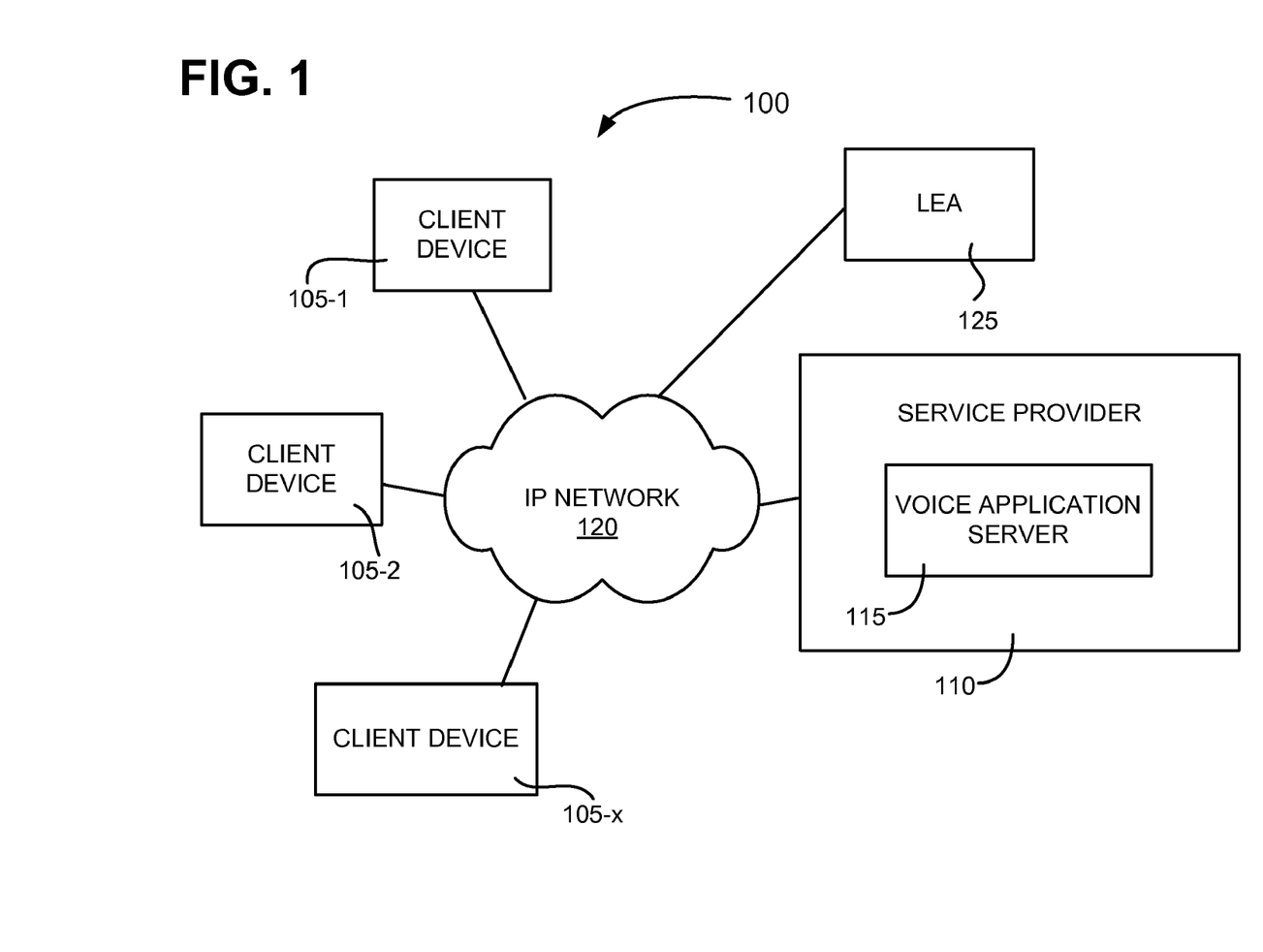
FIG. 1 illustrates a block diagram of an exemplary environment in which systems and methods described herein may be implemented.

FIG. 1 is a block diagram of an exemplary environment 100 in which systems and methods described herein may be implemented. As shown, environment 100 may include a number of client devices 105-1, 105-2, and 105-x (collectively "client devices 105" and individually "client device 105") connected to network 120, either directly, or indirectly. Environment 100 may also include a service provider 110, a voice application server 115, an Internet Protocol (IP) network 120, and a law enforcement agency (LEA) 125.

Consistent with embodiments described herein, client devices 105 may include any suitable device for enabling voice communication via IP network 120, such as wired voice over IP (VoIP) telephones, session initiation protocol (SIP) telephone devices, H.323 telephone devices, software-based VoIP telephony interfaces (for running on laptop or personal computers), wireless (e.g., 802.11(x)-based) VoIP phones, conventional analog telephones connected to IP network 120 via digital gateways, or any device capable of initiating, transmitting, and receiving voice and data communications to network 120. It should be understood that although environment 100 includes three client devices 105, in practice, a typical system may include any number and type of client devices 105.

Service provider 110 may include one or more devices configured to facilitate communication between client devices 105 via network 120. For example, in one implementation, service provider 110 may include devices associated with a telecommunications provider, such as an Internet service provider (ISP), a VoIP service provider, etc.

As shown schematically in FIG. 1, in some implementations, service provider 110 may include a voice application server 115 (among other devices and components). Voice application server 115 may include any device or combination of devices configured to support voice communications to or from client devices 105. For example, voice application server 115 may be configured to maintain and enforce calling policies relating to calls to and from client devices 105.

LEA 125 may include any authorized law enforcement agency, such as a local or state police force, sheriff's office, etc., or a federal law enforcement agency, such as the Federal Bureau of Investigation (FBI), the Drug Enforcement Agency (DEA), the Bureau of Alcohol, Tobacco, and Firearms and Explosives (ATF), etc.

As described in additional detail below, upon receipt of an authorized request from LEA 125, service provider 110 may dynamically configure voice application server 115, and modify the calling policies associated with one or more client devices 105.

IP network 120 may include any packet-based network capable of permitting devices 105-115 to communicate with each other. For example, IP network 120 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

The exemplary configuration illustrated in FIG. 1 is provided for simplicity. It should be understood that a typical network may include more or fewer devices or entities than those illustrated in FIG. 1. For example, other devices that facilitate communications between the various entities illustrated in FIG. 1 may also be included in environment 100.

In some embodiments, the functionality of service provider 110 and/or voice application server 115 may be implemented in other devices, such as a particular client device 105 (e.g., a desktop computer, laptop, or client device, such as a router, gateway or switch). Additional details regarding the operation of service provider 110 and/or voice application server 115 are set forth in additional detail below.

Figure 2:
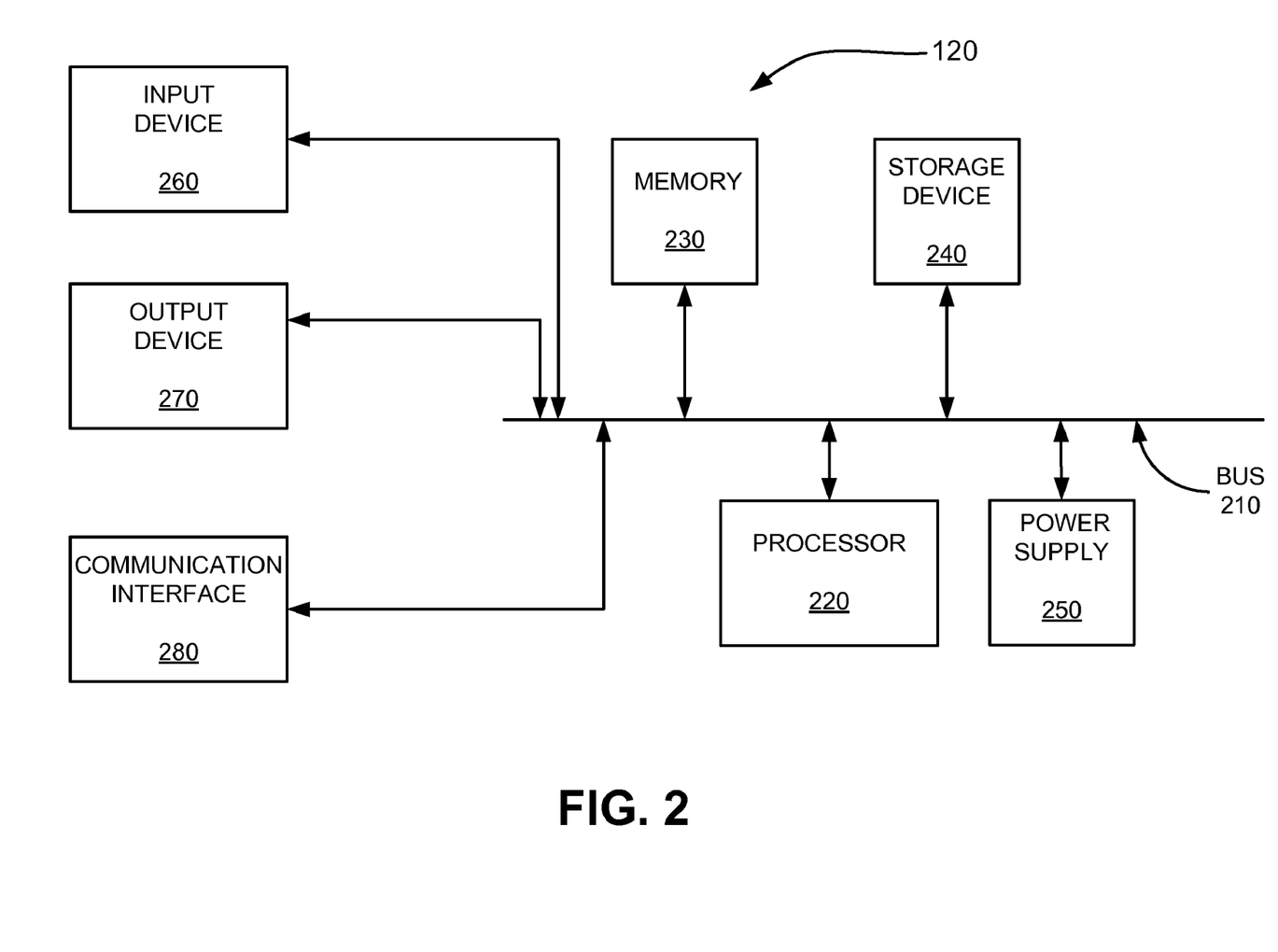
FIG. 2 is a diagram illustrating exemplary components of an exemplary device of FIG. 1.

FIG. 2 is a diagram illustrating components of an exemplary client device 105 or voice application server 115. Referring to FIG. 2, device 105/115 (e.g., a server, VoIP phone, etc.) may include bus 210, processor 220, memory 230, storage device 240, power supply 250, input device 260, output device 270, and communication interface 280. Device 105/115 may be configured in a number of additional ways and may include other or different elements. For example, device 105/115 may include one or more modulators, demodulators, encoders, decoders, etc., for processing data.

Bus 210 may include a path that permits communication among the elements of device 105/115. Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic or static (e.g., read only memory (ROM)) storage device that may store information and instructions for execution by processor 220. Storage device 240 may include a magnetic and/or optical recording medium and its corresponding drive. Power supply 250 may include a battery or other power source powering device 105/115.

Input device 260 may permit a user to input information to client device 105/115, such as a camera, a sensor (e.g., a motion detector), microphone, a keypad, a keyboard, a touch screen, a mouse, a pen, etc. Output device 270 may output information to the user, such as a display, a printer, one or more speakers, etc.

Communication interface 280 may include a transceiver that enables device 105/115 to communicate with other devices and/or systems, such as other client devices 105 and/or service provider 110. For example, communication interface 280 may include interfaces, such as a modem or Ethernet interface, for communicating via a network, such as network 120.

In implementations consistent with embodiments described herein, device 105/115 may perform processing associated with receiving and implementing security policies in relation to permitted VoIP voice calls. Device 105/115 may perform these operations in response to processor 220 executing sequences of instructions contained in a computer-readable medium, such as memory 230. A computer-readable medium may include a physical or logical memory device. The software instructions may be read into memory 230 from another computer-readable medium, such as data storage device 240, or from another device via communication interface 280. The software instructions contained in memory 230 may cause processor 220 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs high-speed mathematical or logical operations, or that assembles, stores, correlates, or otherwise processes information.

Figure 3:
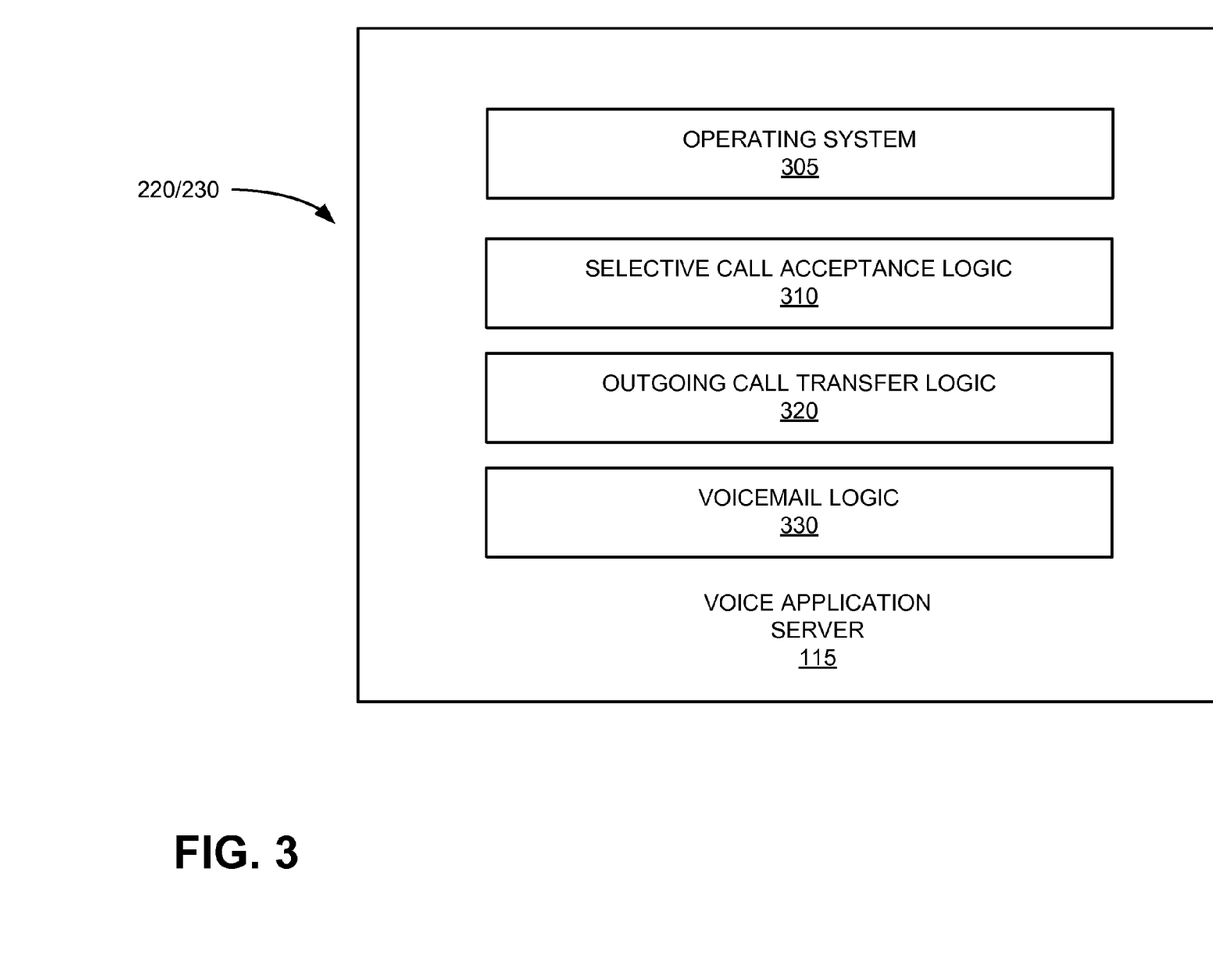
FIG. 3 is a functional block diagram of exemplary components implemented in the voice application server of FIG. 1.

FIG. 3 is a functional block diagram of exemplary components implemented in voice application server 115 of FIG. 1. The logical blocks illustrated in FIG. 3 may be implemented in software, hardware, a combination of hardware and software. In alternative implementations, some or all of the components illustrated in FIG. 3 may be implemented in other devices or combinations of devices, such as client devices 105, and/or other devices (e.g., servers, switches, gateways, etc.). Referring to FIG. 3, memory 230 may include an operating system 305, selective call acceptance logic 310, outgoing call transfer logic 320, and voicemail logic 330. Various logic components illustrated in FIG. 3 may be implemented by processor 220 executing one or more programs stored in memory 230. In some implementations, one or more components of FIG. 3 may be implemented in other devices associated with voice application server 115, such as database or other structures.

Operating system 305 may include software instructions for managing hardware and software resources of voice application server 115. Operating system 305 may manage, for example, its file system, device drivers, communication resources (e.g., radio receiver(s), transmission control protocol (TCP)/IP stack), event notifications, etc. Operating system 305 may include Windows® Server, Apple OS X, a Linux distribution, Solaris, etc.

As briefly described above, voice application server 115 may be configured to support the implementation of calling policies for VoIP subscribers and devices. More specifically, selective call acceptance logic 310 may include software or a combination of hardware and software configured to limit call reception for a particular subscriber VoIP telephone number (corresponding to one or more client devices 105) to a telephone number (TN) associated with requesting LEA 125. In this manner, only authorized calls from the LEA are forwarded to the affected client device(s) 105 (e.g., the client devices associated with the law enforcement event). For example, selective call acceptance logic 310 may be configured to receive instructions from a representative associated with service provider 110 indicating the LEA TN (or TNs) from which incoming calls are permitted.

In some implementations, voice application server 115 may include web server or similar functionality for providing an interface to selective call acceptance logic 310. In such an implementation, the representative associated with service provider 110, upon receipt of an authorized request from LEA 125, may establish and activate a law enforcement action incoming call policy for the affected client device(s) 105 via the web interface. For example, such a law enforcement action incoming call policy may designate at least the affected telephone numbers or client devices 105 and the authorized incoming call numbers.

Following activation of the law enforcement action incoming call policy, selective call acceptance logic 310 may compare incoming calls to the subscriber telephone number to the authorized LEA incoming telephone number (or numbers) identified in the law enforcement action incoming call policy. This may be done using the ANI (automatic number identification) associated with the calling telephone. For VoIP embodiments, source address information (e.g., source SIP (session initiation protocol) address information) may be used to identify the calling telephone number. If the incoming call is determined to be from an authorized LEA telephone number, selective call acceptance logic 310 may forward the call to client device(s) 105 associated with the subscriber telephone number. Otherwise the calls may be blocked, disconnected, or otherwise handled (as described in additional detail below).

Figures 4A, 4B:
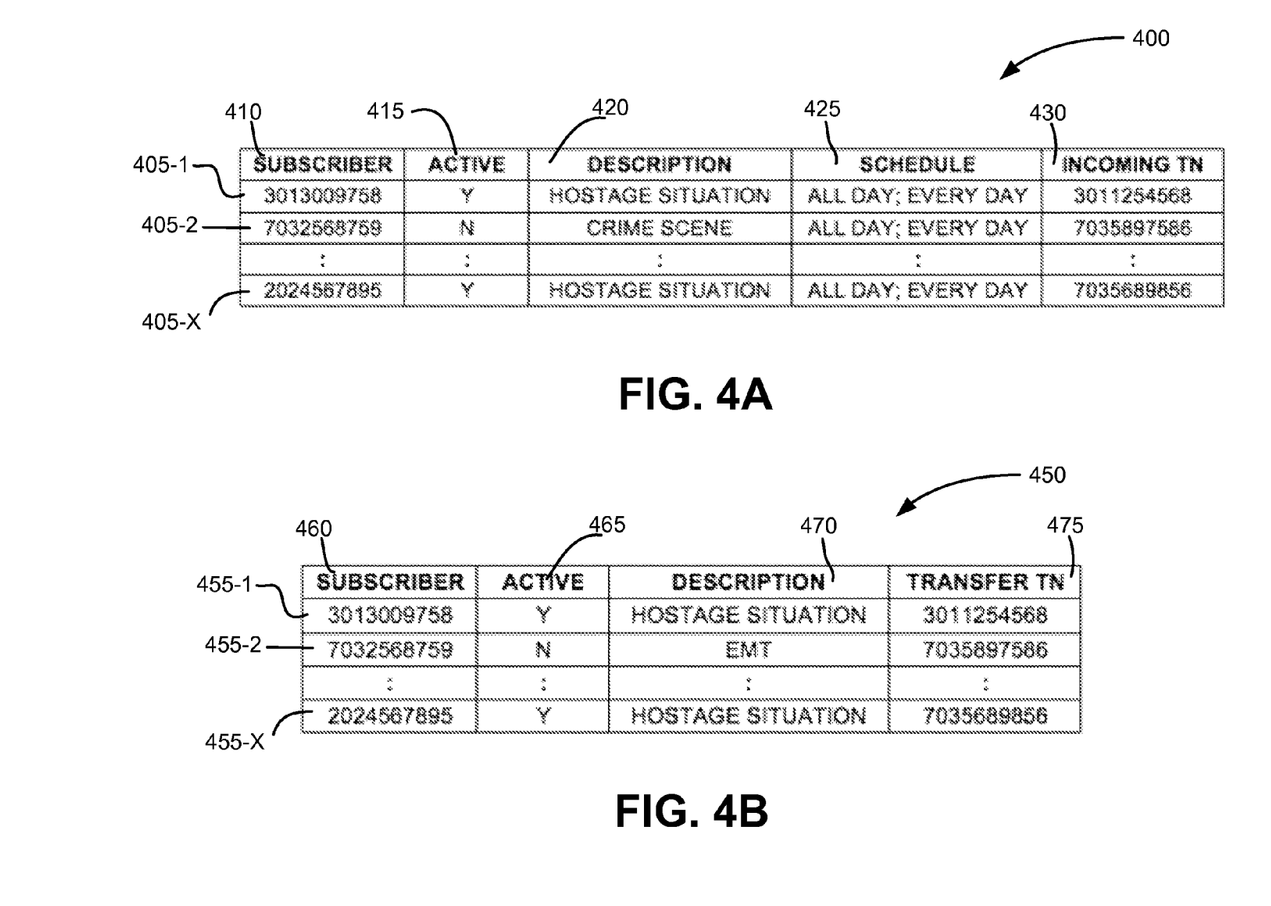
FIGS. 4A and 4B are exemplary call policy tables.

FIG. 4A is an exemplary incoming call policy table 400. As shown, incoming call policy table 400 may include a number of entries 405-1 to 405-x (collectively referred to as "entries 405" and individually as "entry 405"). Each entry 405 in incoming call policy table 400 may correspond to a particular incoming call policy for a particular subscriber telephone number. That is, incoming call policy table entries may be provided for a number of subscribers and subscriber telephone numbers. In an exemplary embodiment, each entry 405 may include a subscriber identifier field 410, an active field 415, a description field 420, a schedule field 425, and an incoming telephone number field 430.

Subscriber identifier field 410 in each entry 405 may include a value representing the telephone number of a particular subscriber with which the entry is associated. For example, entry 405-1 indicates a subscriber identifier of 3013009758, which corresponds to a telephone number of 301-300-9758. Active field 415 includes a value indicative of whether the policy entry is active or not, with a "Y" indicating that the policy is active and a "N" indicating that the policy is not active.

Description field 420 includes a textual description of the policy and may be used when selecting from a number of available policies. For example, policy entry 405-1 includes the description "Hostage Situation" and policy entry 405-2 includes the description "Crime Scene" in description field 420.

Schedule field 425 includes values representative of desired day and time enforcement scheduling for an active policy. For example, an active incoming call policy may designate enforcement all day and every day (as indicated in policies 405-1 to 405-x); however in other instances, particular days and time ranges may be designated.

Incoming telephone number field 430 may include a value (or values) representing one or more telephone numbers (or other identifier) from which incoming calls are allowed. For example, incoming telephone number field 430 in entry 405-1 indicates an authorized incoming telephone number of 301-125-4568.

Returning to FIG. 3, outgoing call transfer logic 320 may include software or a combination of hardware and software configured to direct all outgoing calls placed from a particular subscriber VoIP telephone number (corresponding to one or more client devices 105) to a specific TN associated with requesting LEA 125. In this manner, any call from an affected client device 105 (e.g., associated with a specific subscriber telephone number) is automatically directed to LEA 125. For example, outgoing call transfer logic 320 may be configured to receive instructions from a representative associated with service provider 110 indicating the LEA TN (or TNs) to which outgoing calls should be directed or transferred. That is, regardless of the dialed digits or selected called party information received at an affected client device 105, a call initiated thereto will result in a call to the LEA TN.

As described briefly above, voice application server 115 may include a web server or similar functionality for providing an interface to outgoing call transfer logic 320. In such an implementation, the representative associated with service provider 110, upon receipt of an authorized request from LEA 125, may establish and activate a law enforcement action outgoing call policy for the affected client device(s) 105 via the web interface. For example, such a law enforcement action outgoing call policy may designate at least the affected telephone numbers or client devices 105 and the outgoing LEA telephone number to which outgoing calls are to be transferred.

Following activation of the law enforcement action outgoing call policy, outgoing call transfer logic 320 may automatically transfer all outgoing calls from client devices 105 associated with the subscriber telephone number to the authorized LEA telephone number identified in the law enforcement action outgoing call policy.

In one particular implementation, outgoing call transfer logic 320 may be configured to provide transfer functionality independently for different types of calls, such as local calls, toll free calls, toll calls, international calls, etc. In such an implementation, the law enforcement action outgoing call policy may be individually applied to each type of call individually.

FIG. 4B is an exemplary outgoing call policy table 450. As shown, outgoing call policy table 450 may include a number of entries 455-1 to 455-x (collectively referred to as "entries 455" and individually as "entry 455"). Each entry 455 in outgoing call policy table 450 may correspond to a particular outgoing call policy for a particular subscriber telephone number. That is, outgoing call policy table entries may be provided for a number of subscribers and subscriber telephone numbers. In an exemplary embodiment, each entry 455 may include a subscriber identifier field 460, an active field 465, a description field 470, and a transfer number field 475.

Subscriber identifier field 460 in each entry 455 may include a value representing the telephone number of a particular subscriber with which the entry is associated. For example, entry 455-1 indicates a subscriber identifier of 3013009758, which corresponds to a telephone number of 301-300-9758. Active field 465 includes a value indicative of whether the particular policy entry is active or not, with a "Y" indicating that the policy is active and a "N" indicating that the policy is not active.

Description field 470 includes a textual description of the policy and may be used when selecting from a number of available policies. For example, policy entry 455-1 includes the description "Hostage Situation" and policy entry 455-2 includes the description "EMT" in description field 470.

Transfer number field 475 may include a value (or values) representing the telephone number (or other identifier (e.g., SIP address)) to which all outgoing calls are to be transferred. For example, transfer number field 475 in entry 455-1 indicates an telephone number of 301-125-4568.

Returning to FIG. 3, voicemail logic 330 may include software or a combination of hardware and software configured to handle voicemail configurations with respect to any active incoming call policies. For example, voicemail logic 330 may be configured to receive instructions from a representative associated with service provider 110 indicating whether voicemail is enabled for unauthorized (e.g., blocked) incoming calls to the particular subscriber telephone number.

Consistent with implementations described herein, selective call acceptance logic 310, outgoing call transfer logic 320, and voicemail logic 330 may function in response to receipt of customer identification information and authorized LEA telephone numbers. For example, a web server application associated with voice application server 115 may be configured to receive a "hostage situation LEA preemption" command (or similar) from a representative of service provider 110. For example, voice application server 115 may be configured to include an interface for receiving electronic messages from LEA 125 via network 120. The "hostage situation LEA preemption" command may designate one or more subscriber telephone numbers, and one or more authorized LEA telephone numbers.

In response, selective call acceptance logic 310 may automatically generate and activate a corresponding incoming call policy, outgoing call transfer logic 320 may automatically generate and activate a corresponding outgoing call transfer policy, and voicemail logic 330 may automatically deactivate voicemail for incoming calls. In this manner, service provider 110 may be capable of quickly and efficiently providing telephone line preemption on the part of an authorized LEA.

In some implementations, voice application server 115 and/or service provider 110 may be provided with a LEA request authorization logic (not shown) for automatically verifying received LEA call preemption requests. For example, service provider 110 may be configured to validate the request against a judicial entity, such as a court system having jurisdiction over the subscriber location.

Figure 5:
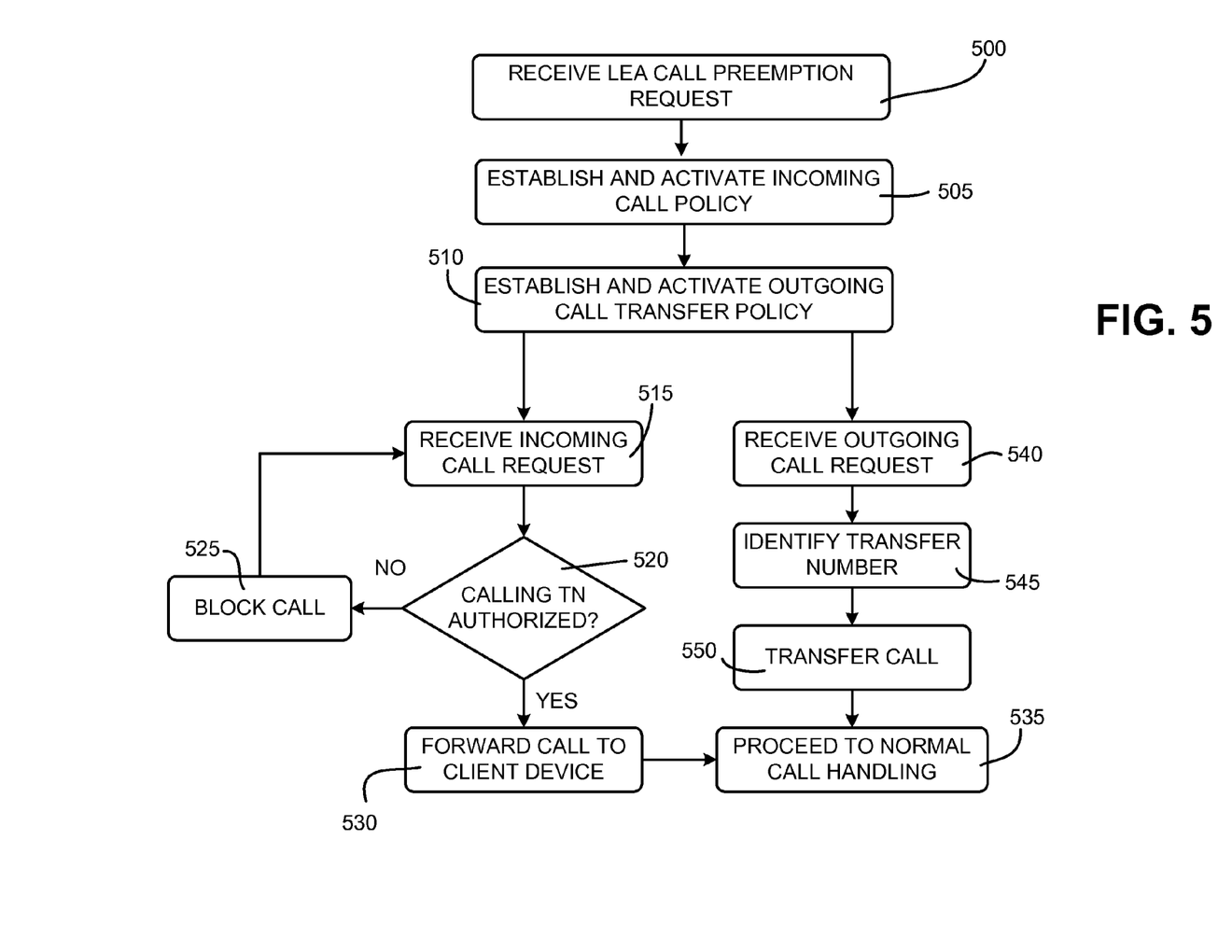
FIG. 5 is a flow diagram illustrating exemplary processing associated with providing a law enforcement voice call preemption service in an embodiment described herein.

FIG. 5 is a flow diagram illustrating exemplary processing associated with providing a law enforcement voice call preemption service in an embodiment described herein. Processing may begin with service provider 110 receiving a request from LEA 125 to preempt voice communications with a particular location (e.g., one or more client devices 105) (block 500). For example, a representative of service provider 110 may receive a telephone call or electronic request (e.g., alert message, an email, etc.) that indicates the particular subscriber telephone number(s) (or VoIP address(es)), the authorized LEA telephone numbers, and/or the nature of the law enforcement event (e.g., hostage situation, crime scene, etc.). As briefly described above, in some implementations, service provider 110 may be configured to include an electronic or automated interface for receiving LEA voice preemption requests.

Upon receipt of an authorized LEA request, service provider 110 (e.g., a representative or an automated system) may create and activate an incoming call policy on selective call acceptance logic 310 based on the received request (block 505). For example, as described above, selective call acceptance logic 310 may be configured via a web server interface associated with voice application server 115 to include an incoming call policy indicating at least one subscriber telephone number and at least one authorized LEA telephone number.

In addition, service provider 110 (e.g., a representative or an automated system) may create and activate an outgoing call transfer policy on outgoing call transfer logic 320 based on the received request (block 510). For example, as described above, outgoing call transfer logic 310 may be configured via a web server interface associated with voice application server 115 to include an outgoing call transfer policy indicating at least one subscriber telephone number and an authorized LEA telephone number to which outgoing calls should be transferred. Upon activation of both the incoming and outgoing call policies, processing may proceed on two different paths, based on whether an incoming call is received, or an outgoing call is attempted.

In the first path, assume that voice application server 115 receives an incoming call intended for a subscriber telephone number for which the incoming call policy has been activated in block 510 (block 515). Selective call acceptance logic 310 may determine whether the telephone number associated with the incoming call matches an authorized telephone number in incoming call policy table 400 for the subscriber telephone number (block 520). For example, referring to incoming call policy table 400, for a call received at 301-300-9758 (entry 405-1), it may be determined whether the incoming call is from 301-125-4568 (incoming TN field 430). This determination may be based on the ANI information associated with the incoming call. In other instances, SIP or other VoIP addressing information may be used to determine the incoming call telephone number.

If the telephone number associated with the incoming call does not match an authorized telephone number (block 520—NO), the call may be blocked (e.g., the call is not forwarded to any client device 105 associated with the subscriber telephone number) (block 525). As briefly described above, in some implementations, blocked calls may be forwarded to a voicemail associated with the subscriber telephone number, while in other instances, the caller may simply be notified that their call cannot be completed at this time. Processing may then return to block 515 for the next incoming call request.

However, if the telephone number associated with the incoming call does match an authorized telephone number (block 520—YES), the call may be forwarded to one or more client devices 105 associated with the subscriber telephone number (block 530). Call handling may then proceed in a usual manner (block 535).

In the second path from block 510, assume that voice application server 115 receives a request from a client device 105 associated with the subscriber telephone number to place an outgoing call (block 540). Upon receipt of this request, outgoing call transfer logic 320 may access table 450 and identify the LEA transfer number to which outgoing calls are to be transferred based on the active outgoing call transfer policy (block 545). For example, referring to outgoing call transfer policy table 450, for calls received from telephone number 301-300-9758 (entry 455-1), the authorized LEA transfer number 301-125-4568 may be identified from field 475 in entry 455-1. The attempted outgoing call may then be transferred to the identified LEA transfer number (block 550). Processing may proceed to block 535 for normal call processing.

Consistent with implementations described herein, law enforcement agencies may be easily and efficiently provided with call preemption capabilities for VoIP subscribers. More specifically, a voice application server for handling call services in a VoIP system may be configured to easily establish, activate, and enforce both incoming and outgoing call policies that prevent unauthorized voice traffic from reaching a particular location serviced by a VoIP service provider.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of blocks have been described with respect to FIG. 5, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving a call preemption request from a law enforcement agency (LEA) designating at least one subscriber telephone number and at least one LEA telephone number,
   wherein the at least one subscriber telephone number is associated with a voice over Internet protocol (VoIP) calling plan subscriber;
   generating, at a voice application server, an incoming call policy configured to allow incoming calls to the at least one subscriber telephone number from only the at least one LEA telephone number;
   storing the incoming call policy in a memory associated with the voice application server;
   activating the incoming call policy;
   generating, at the voice application server, an outgoing call transfer policy configured to automatically transfer all outgoing calls from the at least one subscriber telephone number to a designated one of the at least one LEA telephone numbers;
storing the outgoing call transfer policy in the memory associated with the voice application server;
activating the outgoing call transfer policy;
receiving, at the voice application server, an incoming call request for the at least one subscriber telephone number;
determining whether a calling number associated with the incoming call request matches one of the at least one LEA telephone numbers; and
blocking the incoming call request when the calling number associated with the incoming call request does not match one of the at least one LEA telephone numbers.

2. The method of claim 1, wherein generating the incoming call policy comprises:
entering the at least one subscriber telephone number and the at least one authorized LEA telephone number into a web server interface associated with the voice application server.

3. The method of claim 1, wherein generating the outgoing call transfer policy comprises:
entering the at least one subscriber telephone number and the designated one of the at least one LEA telephone numbers into a web server interface associated with the voice application server.

4. The method of claim 1, wherein the incoming call policy is further configured to include scheduling information for enforcement of the incoming call policy.

5. The method of claim 1, further comprising:
generating, at the voice application server, a voicemail policy configured to designate whether blocked incoming call requests are sent to a voice mail account associated with the at least one subscriber telephone number.

6. The method of claim 1, wherein the at least one subscriber telephone number comprises a VoIP subscriber address.

7. The method of claim 6, wherein the VoIP subscriber address comprises a session initiation protocol (SIP) address.

8. The method of claim 1, further comprising:
receiving an outgoing call request from one of the at least one subscriber telephone numbers; and
automatically transferring the outgoing call request to the designated LEA telephone number based on the outgoing call policy.

9. The method of claim 1, wherein receiving the call preemption request comprises receiving an electronic notification of the call preemption request at a VoIP service provider associated with the at least one subscriber telephone number.

10. A system for providing law enforcement call preemption in a voice over Internet protocol (VoIP) calling system, comprising:
a service provider configured to receive a call preemption request from an authorized law enforcement agency (LEA),
wherein the call preemption request designates at least one subscriber telephone number and at least one LEA telephone number; and
a voice application server for handling VoIP calls to and from the at least one subscriber telephone number,
wherein the voice application server is configured to:
receive call preemption request information from the service provider;
generate an incoming call policy configured to allow incoming calls to the at least one subscriber telephone number from only the at least one LEA telephone number;
store the incoming call policy in a memory associated with the voice application server;
activate the incoming call policy;
generate an outgoing call transfer policy configured to automatically transfer all outgoing calls from the at least one subscriber telephone number to a designated one of the at least one LEA telephone numbers;
store the outgoing call transfer policy in the memory associated with the voice application server; and
activate the outgoing call transfer policy.

11. The system of claim 10, wherein the voice application server is further configured to:
receive an incoming call request for the at least one subscriber telephone number;
determine whether a calling number associated with the incoming call request matches one of the at least one LEA telephone numbers; and
block the incoming call request when the calling number associated with the incoming call request does not match one of the at least one LEA telephone numbers.

12. The system of claim 10, wherein the voice application server further comprises a web server interface,
wherein the service provider is further configured to transmit the at least one subscriber telephone number and the at least one authorized LEA telephone number to the voice application server via the web server interface; and
wherein the voice application server is configured to automatically generate the incoming call policy and the outgoing call transfer policy based on the information received via the web server interface.

13. The system of claim 10, wherein the voice application server is further configured to generate a voicemail policy configured to designate whether blocked incoming call requests are sent to a voice mail account associated with the at least one subscriber telephone number.

14. The system of claim 10, wherein the at least one subscriber telephone number comprises a VoIP subscriber address.

15. The system of claim 10, wherein the voice application server is further configured to:
receive an outgoing call request from one of the at least one subscriber telephone numbers; and
automatically transfer the outgoing call request to the designated LEA telephone number based on the outgoing call policy.

16. The system of claim 10, wherein the service provider is configured to receive the call preemption request via an electronic notification from the LEA, and
automatically generate the incoming call policy and outgoing call transfer policy in response to the received request.

17. A non-transitory computer-readable medium having stored thereon sequences of instructions which, when executed by at least one processor, cause the at least one processor to:
receive a call preemption request from a law enforcement agency (LEA) designating at least one subscriber telephone number and at least one LEA telephone number,
wherein the at least one subscriber telephone number is associated with a voice over Internet protocol (VoIP) calling plan subscriber;
generate, at a voice application server, an incoming call policy configured to allow incoming calls to the at least one subscriber telephone number from only the at least one LEA telephone number;
store the incoming call policy in a memory associated with the voice application server;

activate the incoming call policy;

generate, at the voice application server, an outgoing call transfer policy configured to automatically transfer all outgoing calls from the at least one subscriber telephone number to a designated one of the at least one LEA telephone numbers;

store the outgoing call transfer policy in the memory associated with the voice application server; and activate the outgoing call transfer policy.

18. The non-transitory computer-readable medium of claim 17, further comprising instructions to cause the at least one processor to:

receive, at the voice application server, an incoming call request for the at least one subscriber telephone number;

determine whether a calling number associated with the incoming call request matches one of the at least one LEA telephone numbers; and block the incoming call request when the calling number associated with the incoming call request does not match one of the at least one LEA telephone numbers.

19. The non-transitory computer-readable medium of claim 17, further comprising instructions to cause the at least one processor to:

receive an outgoing call request from one of the at least one subscriber telephone numbers; and automatically transfer the outgoing call request to the designated LEA telephone number based on the outgoing call policy.

20. The non-transitory computer-readable medium of claim 19, wherein the instructions to receive an outgoing call request from one of the at least one subscriber telephone numbers further comprise:

instructions to receive an outgoing call request from a client device associated with the one of the at least one subscriber telephone numbers.

* * * * *